United States Patent [19]

Ootsuka

[11] Patent Number: 4,465,911
[45] Date of Patent: Aug. 14, 1984

[54] SWITCH OPERATING APPARATUS FOR A MOVABLE ELECTRIC DEVICE
[75] Inventor: Kenichi Ootsuka, Amagasaki, Japan
[73] Assignee: Mitsubishi Denki Kabushiki Kaisha, Tokyo, Japan
[21] Appl. No.: 510,421
[22] Filed: Jul. 1, 1983
[30] Foreign Application Priority Data
 Jan. 7, 1983 [JP] Japan ................................. 58-1355
[51] Int. Cl.³ ............................................. H01H 3/20
[52] U.S. Cl. ................................... 200/331; 220/337; 74/504
[58] Field of Search .............................. 200/329–332, 200/336–338, 48 R, 49; 74/494, 504

[56] References Cited
U.S. PATENT DOCUMENTS 2,036,948  4/1936  McNary ................................. 74/504
3,821,532  6/1974  Isaac, Jr. et al. ..................... 200/330
4,095,061  6/1978  Bridges ............................. 200/337 X
4,291,212  9/1981  Bui .................................... 200/331

FOREIGN PATENT DOCUMENTS 373010  4/1923  Fed. Rep. of Germany ...... 200/338

Primary Examiner—John W. Shepperd
Assistant Examiner—Renee S. Kidorf
Attorney, Agent, or Firm—Wenderoth, Lind & Ponack

[57] ABSTRACT

A switch operating apparatus for the disconnecting switch of a movable electric device carried on a vehicle such as a trailer has a rotating plate rotatably mounted on the side of the vehicle, an upper operating rod connected to the disconnecting switch, a lower operating rod connected to the upper operating rod by a universal or other flexible coupling, and an operating handle which detachably connects to the lower operating rod. The rotating plate has a downward-extending operating position and a horizontally-extending storage position. When in the operating position, it can be safely and easily operated by an operator standing on the ground, and in the storage position, it is clear of the tractor truck which tows the trailer. It is thus superior to coventional switch operating apparatuses which need to be detached from the disconnecting switch when the vehicle is moved or else are mounted so high on the vehicle that the operator can not operate the apparatus while standing on the ground.

5 Claims, 10 Drawing Figures

SWITCH OPERATING APPARATUS FOR A MOVABLE ELECTRIC DEVICE

BACKGROUND OF THE INVENTION

This invention relates to a switch operating apparatus for operating a disconnector switch of a movable electric device such as a movable transformer, the electric device being carried on a vehicle such as a trailer.

FIGS. 1 and 2 show two commonly used types of switch operating apparatuses mounted on trailers carrying a movable electric device. In the drawings, 1 designates the semi-trailer of a tractor-trailer combination (tractor truck not shown in the drawings). On the trailer 1 are loaded a movable electric device comprising a transformer 2, a circuit breaker 3, a lightning arrestor 5, a cubicle switchboard 6, and a disconnecting switch 4 provided with a switch operating apparatus 7.

In both figures, the disconnecting switch 4 is located near the front of the trailer 1 atop the front luggage carrier 1a. A switch operator 9 controls the disconnecting switch 4 by manually operating the switch operating apparatus 7.

A main difference between these two switch operating apparatuses 7 is that the one shown in FIG. 1 is detachably mounted on the front luggage carrier 1a in a low position close to the ground, while the switch operating apparatus shown in FIG. 2 is permanently mounted on the front luggage carrier 1a in a high position far from the ground.

The switch operating apparatus 7 of FIG. 1 has the advantage that it can be easily and safely operated by an operator 9 standing on the ground, but it has the drawback that it must be disconnected from the disconnecting switch 4 and moved to some other location for storage whenever the trailer 1 is moved. Otherwise, it would interfere with the rear wheels of the tractor truck which tows the trailer 1, particularly when making turns, since the tractor truck fits beneath the front luggage carrier 1a and connects to the connecting portion 1b when it tows the trailer 1.

The switch operating apparatus 7 of FIG. 2, which is permanently mounted high off the ground, has the advantage that it never interferes with the rear wheels of the tractor truck and thus never needs to be moved, but it has the great disadvantage that the operator 9 must stand on some sort of mount 8 in order to operate it. This is not only inconvenient, but it is also unsafe, particularly when working on unlevel ground.

SUMMARY OF THE INVENTION

It is the object of the present invention to overcome the drawbacks of presently existing switch operating apparatuses such as those shown in FIGS. 1 and 2 and provide a switch operating apparatus for the disconnector switch of a movable electric device carried on a vehicle which can be easily and safely operated by an operator standing on the ground.

It is a further object of the present invention to provide a switch operating apparatus which does not need to be detached from the vehicle when the vehicle is moved.

These objects are achieved by making the switch operating apparatus according to the present invention able to rotate in the vertical plane. When the switch operating apparatus is to be operated, it is rotated to a downward-extending position in which it can be easily and safely operated by an operator standing on the ground. When it is to be stored, it is rotated to a horizontally-extending storage position which is high enough off the ground so as to be clear of the underside of the vehicle and not hinder the tractor truck which tows the vehicle.

A switch operating apparatus for a disconnector switch of a movable electric device carried on a vehicle according to the present invention comprises a rotating plate rotatably mounted on the side of the vehicle, a bearing connected to the lower end of the rotating plate, an upper operating rod having its upper end attached to the disconnector switch of the movable electric device, a lower operating rod having its lower end supported by the bearing, a flexible coupling pivotably connecting the lower end of the upper operating rod and the upper end of the lower operating rod, an operating handle detachably connected to the lower operating rod, and means for securing the rotating plate to the side of the trailer in a horizontally-extending or downward-extending position.

BRIEF DESCRIPTION OF THE DRAWINGS

FIG. 3b is a schematic plan view of a portion of FIG. 3a.

FIG. 4b is a plan view of the embodiment illustrated in FIG. 4a.

DESCRIPTION OF THE PREFERRED EMBODIMENT

Figure 1:
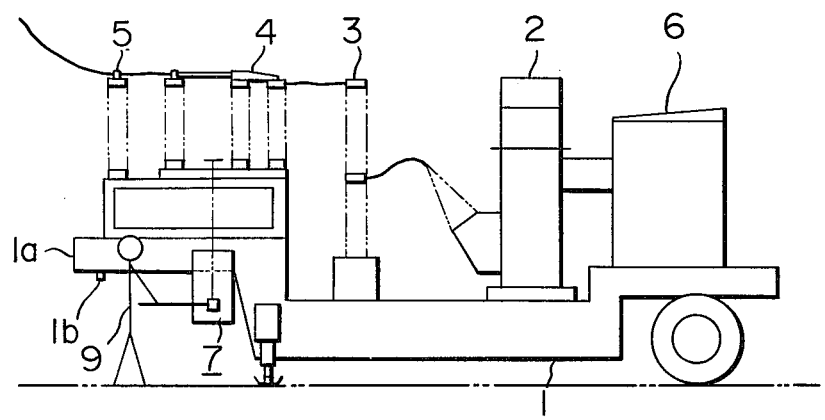
FIG. 1 is a schematic view showing a trailer with one type of presently used switch operating apparatus carried on the trailer, the trailer carrying a movable electric device.

Hereinbelow will be described one embodiment of a switch operating apparatus according to the present invention reference being made to FIGS. 3-5. In these figures, reference numerals identical to those appearing in FIGS. 1 and 2 refer to identical or corresponding parts.

Figure 4A:
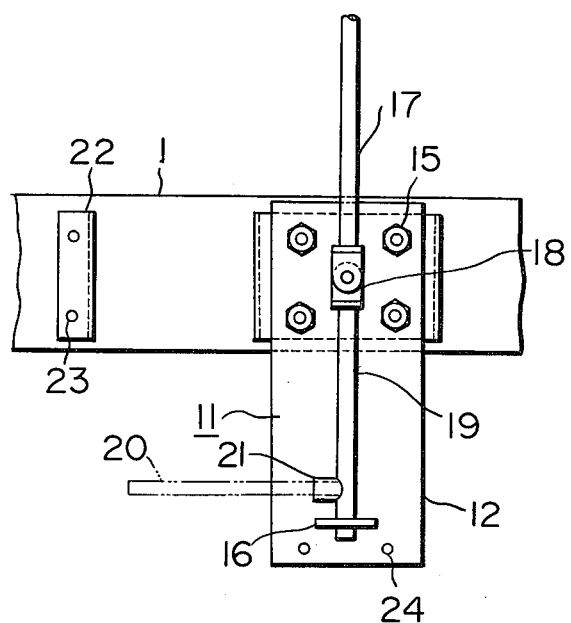
FIG. 4a is a partial front elevation of a switch operating apparatus according to the present invention, showing it mounted on the side of a trailer as it would appear during operation.
Figure 4B:
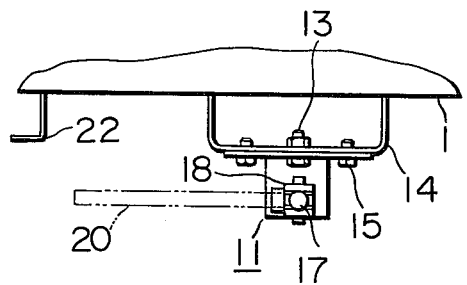
Figure 4C:
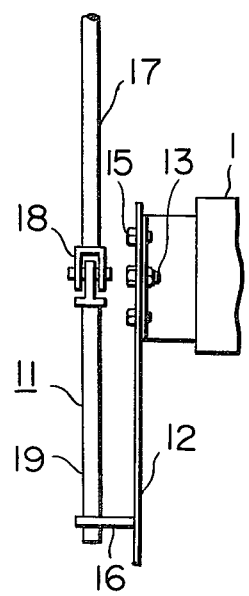
FIG. 4c is a side elevation of the embodiment illustrated in FIG. 4a, partially in cross-section.
Figure 5A:
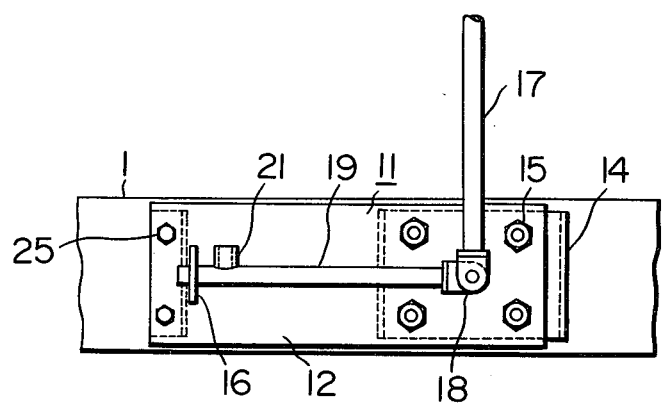
FIGS. 5a, 5b, and 5c are a partial front elevation, a partial plan view, and a partial side elevation, respectively, of the switch operating apparatus according to the present invention, showing it mounted on the side of a trailer as it would appear when the trailer is being moved.

FIGS. 4 and 5 show detailed side and top views of a switch operating apparatus according to the present invention mounted on the side of a trailer 1 which can be towed by a tractor truck 10. In the figures, reference number 11 indicates the switch operating apparatus. 12 designates a rotating plate made of a strong, rigid, weather-resistant material. The rotating plate 12 is rotatably mounted on a U-shaped frame 14 by a center bolt 13 passing through the plate 12, the U-shaped frame 14 being rigidly connected to the side of the trailer 1. 15 designates a first set of detachable securing bolts passing through the rotating plate 12 and screwing into the U-shaped frame 14 so as to prevent the rotating plate 12 from rotating. 16 designates a bearing connected to the lower end of the rotating plate 12. 17 designates an upper operating rod having its upper end connected to the disconnecting switch 4 and having its lower end pivotably connected to a lower operating rod 19 by a flexible coupling 18 such as a knuckle joint or a universal joint. The coupling 18 must permit the lower operating rod 19 to pivot in the vertical plane with respect to the upper operating rod 17 between a vertically-extending position and a horizontally-extending position. The coupling 18 must also transmit the axial rotation of the lower operating rod 19 to the upper operating rod 17. The upper operating rod 17 is connected to the disconnecting switch 4 in such a manner that its axial rotation will open or close the disconnecting switch 4. The lower operating rod 19 has its lower end rotatably supported by the bearing 16 which prevents lateral movement of the lower end but allows free rotation of the lower operating rod 19 about its longitudinal axis. 20 designates an operating handle which detachably fits into a hollow cylindrical projection 21 projecting laterally of the lower operating rod 19 near the lower end of the lower operating rod 19. 22 designates a rest for the rotating plate 12 comprising an angle iron secured to the side of the trailer 1. 23 designates a pair of through holes formed in the rest 22, and 24 designates a matching pair of through holes formed in the rotating plate 12 which align with the through holes 23 when the rotating plate 12 is rotated to the horizontally-extending position shown in FIG. 5a. 25 designates a second set of detachable securing bolts which pass through the holes 24 in the rotating plate 12 and screw into the through holes 23 in the rest 22 when the rotating plate 12 is in the horizontally-extending position.

Figure 5B:
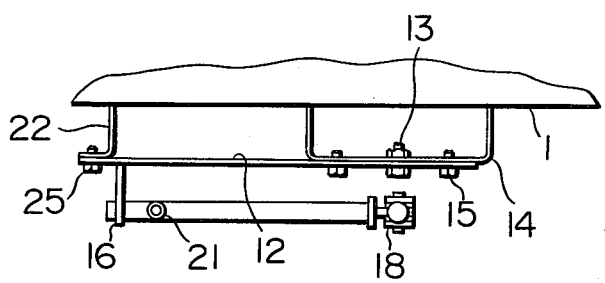
Figure 5C:
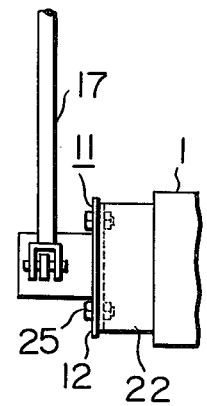

The rotating plate 12 of the switch operating apparatus 11 according to the present invention has two different positions: a downward-extending or operating position pictured in FIGS. 4a-c, and a horizontally-extending or storage position pictured in FIGS. 5a-c. When in the operating position, the rotating plate 12 is prevented from rotating about the center bolt 13 by the first set of securing bolts 15, and when in the storage position, it is prevented from rotating by both the first set of securing bolts 15 and the second set of securing bolts 25. The first set of securing bolts 15, the rest 22, and the second set of securing bolts 25 together constitute means for securing the rotating plate 12 to the side of the trailer 1 in either a horizontally-extending or downward-extending position.

The operation of the present embodiment is as follows. It will be assumed that the rotating plate 12 is in the storage position shown in FIGS. 3a and 5a. In this position, the rotating plate 12 extends horizontally and is thus well clear of the tractor truck 10 which tows the trailer 1. When the switch operating apparatus 11 is to be operated, the first set of securing bolts 15 and the second set of securing bolts 25 are unscrewed from the U-shaped frame 14 and the rest 22, respectively, and the rotating plate 12 is rotated about the center bolt 13 to the operating (downward-extending) position shown in FIG. 4a. The first set of connecting bolts 15 is then screwed back into the U-shaped frame 14 so as to secure the rotating plate 12 in this downward-extending position. The operating handle 20 is then fitted into the hollow cylindrical projection 21. When an operator standing on the ground moves the handle 20 in a horizontal plane, the resulting axial rotation of the lower operating rod 19 is transmitted to the upper operating rod 17, and the disconnecting switch 4 is thereby opened or closed. The length of the lower operating rod 19 is such that an operator standing on the ground can easily and safely control the disconnecting switch 4.

When stowing the switch operating apparatus 11 according to the present invention, the above series of operations is reversed. The handle 20 is removed from the lower operating rod 19, the first set of connecting bolts 15 is unscrewed, the rotating plate 12 is rotated to a horizontally-extending position so that the holes 24 in the rotating plate 12 align with the holes 23 in the rest 22, and the first and second sets of connecting bolts 15 and 22 are again screwed into their respective holes so as to secure the rotating plate 12 in the horizontally-extending position.

Figure 2:
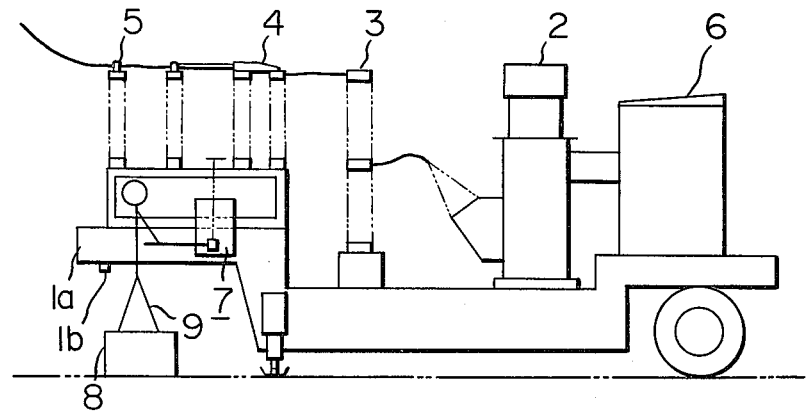
FIG. 2 is a schematic view similar to FIG. 1 showing another presently used type of switch operating apparatus mounted on a trailer which carries a movable electric device.
Figure 3A:
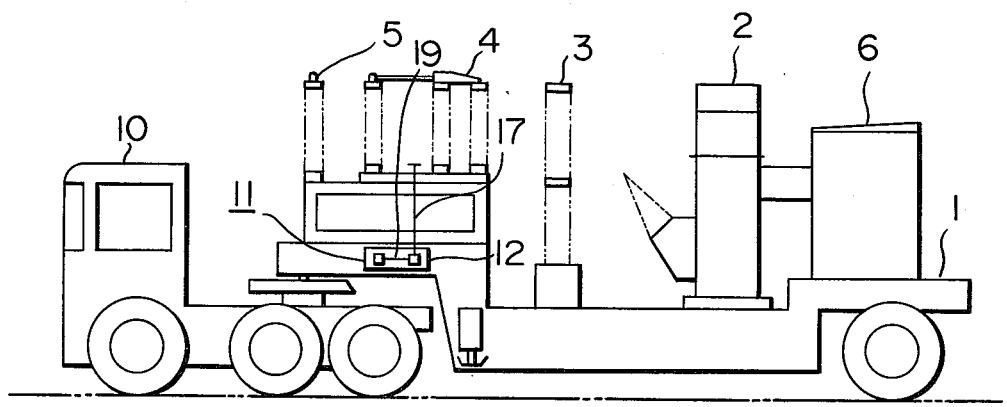
FIG. 3a is a schematic view showing a tractor trailer having a switch operating apparatus according to the present invention carried on the trailer carrying a movable electric device.
Figure 3B:
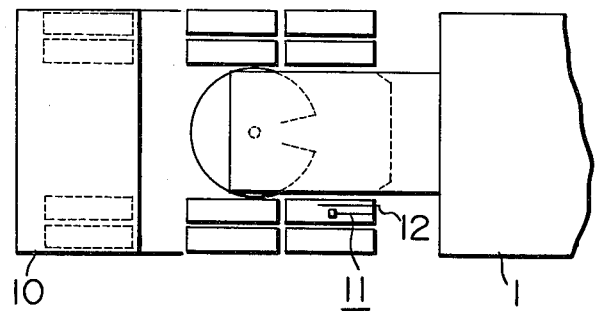

The switch operating apparatus according to the present invention overcomes all the drawbacks of the conventional switch operating apparatuses illustrated in FIGS. 1 and 2. When in the downward-extending operating position, it can be safely and easily operated by an operator standing on the ground, and when in the horizontally-extending storage position, it is mounted high enough off the ground so as to be well clear of the tractor truck 10 which tows the trailer 1, and thus it does not need to be detached from the disconnecting switch 4 when the trailer 1 is to be moved.

What is claimed is:

1. A switch operating apparatus for a disconnecting switch of a movable electric device carried on a vehicle comprising:

a vertically extending upper operating rod with at least the lower part vertical and having its upper end connected to said disconnecting switch in a manner such that rotation of said upper operating rod around its longitudinal axis can operate said disconnecting switch;

a lower operating rod;

a flexible coupling connected to the lower end of said upper operating rod and to the upper end of said lower operating rod for transmitting rotational movement of said lower operating rod about the longitudinal axis thereof to said upper operating rod to rotate said upper operating rod around its longitudinal axis and for permitting said lower operating rod to pivot with respect to said upper operating rod about a horizontal axis perpendicular to a longitudinal axis of the vehicle between a horizontally-extending storage position and a downward-extending operating position; and means for detachably holding said lower operating rod in the storage position.

2. A switch operating apparatus as claimed in claim 1, further comprising:

a rotating plate rotatably mounted on the side of said vehicle; and a bearing mounted at the end of said rotating plate remote from the rotatable mounting of said plate and rotatably supporting said lower operating rod.

3. A switch operating apparatus as claimed in claim 2, in which said rotating plate has one end rotatably mounted on said vehicle for rotation around an axis corresponding to said horizontal axis between a plate storage position corresponding to the lower operating rod storage position and a plate operating position corresponding to the lower rod operating position, said plate having a bearing at the other end thereof rotatably supporting the lower end of said lower operating rod.

4. A switch operating apparatus as claimed in claim 2, further comprising means for securing said rotating plate to the side of said vehicle in either one of a horizontally-extending position or a position extending downward from said rotatable mounting.

5. A switch operating apparatus as claimed in claim 4, further comprising an operating handle detachably connected to the lower end of said lower operating rod.

* * * * *